(12) United States Patent
Van Dine et al.

(10) Patent No.: US 6,740,435 B2
(45) Date of Patent: May 25, 2004

(54) SYSTEM AND METHOD FOR PREPARING FUEL FOR FUEL PROCESSING SYSTEM

(75) Inventors: Leslie L. Van Dine, Manchester, CT (US); Bryan Murach, New Britain, CT (US); Paul R. Margiott, South Windsor, CT (US); Joshua D. Isom, Ellington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 182 days.

(21) Appl. No.: 09/923,228

(22) Filed: Aug. 6, 2001

(65) Prior Publication Data

US 2003/0027025 A1 Feb. 6, 2003

(51) Int. Cl.$^7$ .............................. H01M 8/06; C01B 3/24; C01B 3/36
(52) U.S. Cl. .............................. 429/17; 429/20; 429/26; 423/652
(58) Field of Search .............................. 429/17, 19, 20, 429/26; 423/650–654

(56) References Cited

U.S. PATENT DOCUMENTS

| | | |
|---|---|---|
| 5,043,232 A | 8/1991 | Landau et al. |
| 6,103,411 A | 8/2000 | Matsubayashi et al. |
| 6,120,923 A | 9/2000 | Van Dine et al. |
| 6,375,906 B1 | 4/2002 | Edlund et al. |
| 2002/0004154 A1 | 1/2002 | Pastula et al. |

*Primary Examiner*—Bruce F. Bell
*Assistant Examiner*—Jonathan Crepeau
(74) *Attorney, Agent, or Firm*—Bachman & LaPointe

(57) ABSTRACT

A fuel cell system includes a fuel cell for reacting a hydrogen rich gas; a fuel processor system for converting a hydrocarbon fuel-steam mixture into said hydrogen rich gas; and a system for preparing the hydrocarbon fuel-steam mixture which includes (a) structure for superheating a hydrocarbon fuel so as to provide a superheated fuel, and (b) structure for mixing water with the superheated fuel so as to provide the hydrocarbon fuel-steam mixture.

24 Claims, 2 Drawing Sheets

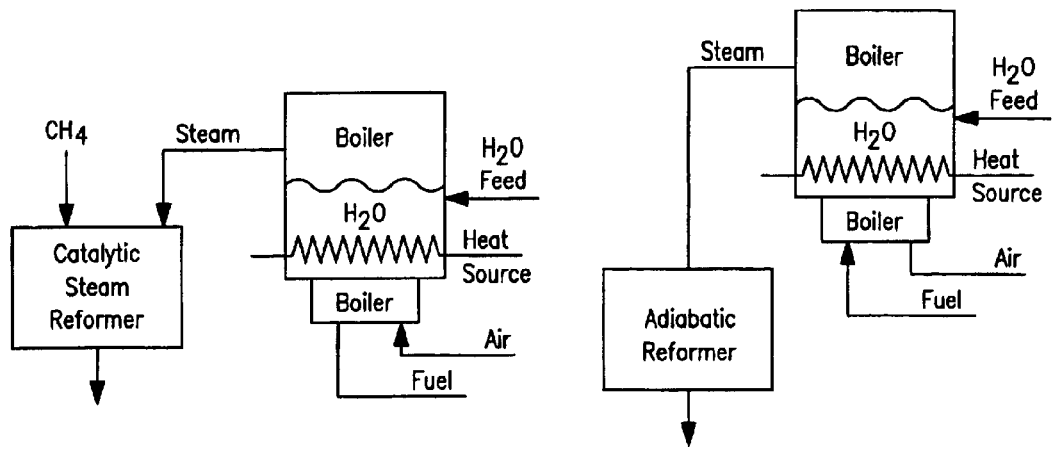
FIG. 1
(PRIOR ART)
FIG. 2
(PRIOR ART)
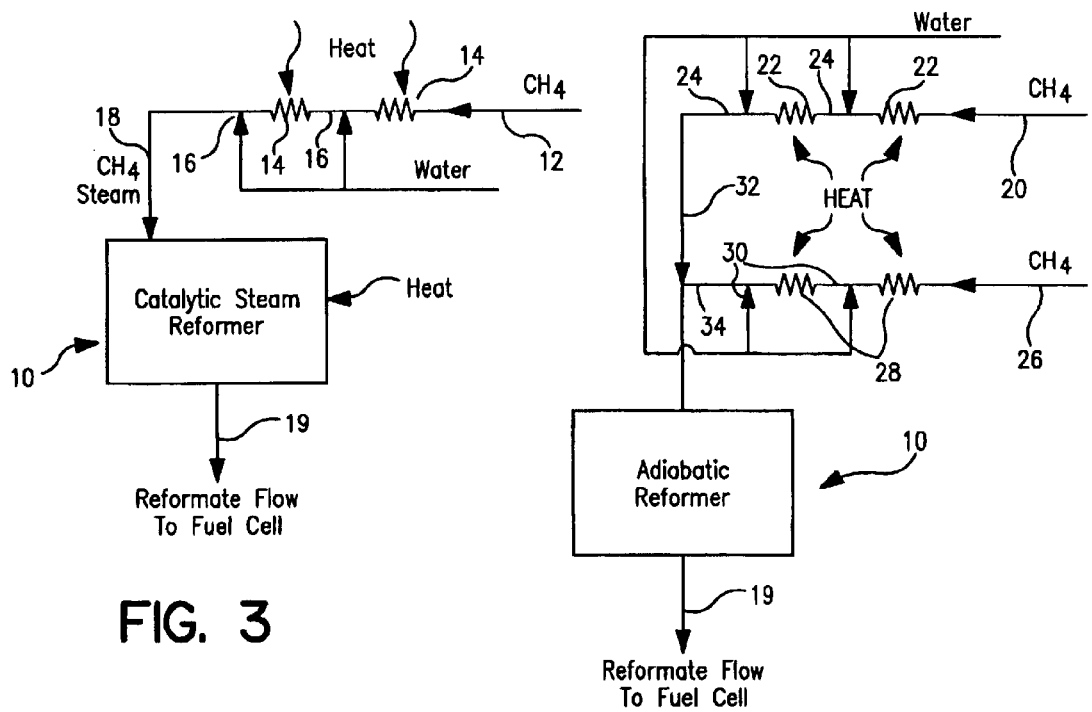
FIG. 3
FIG. 4

SYSTEM AND METHOD FOR PREPARING FUEL FOR FUEL PROCESSING SYSTEM

BACKGROUND OF THE INVENTION

The present invention relates to fuel cell systems and, more particularly, to a system and method for preparing feed for a fuel processing system which produces the required fuel for the fuel cell system.

Fuel cells typically consist of an anode, a cathode and an electrolyte that separates the anode and cathode. The fuel cell uses a fuel reactant gas, which is typically a hydrogen rich stream, and which is introduced into the anode of the fuel cell, while an oxidant reactant gas, typically air, is introduced into the cathode of the fuel cell. A catalyst in the anode causes the hydrogen to oxidize resulting in creation of hydrogen ions, which pass through the electrolyte to the cathode, thereby creating an electric potential across the fuel cell.

There are different types of fuel cells, namely, polymer electrolyte membrane (PEM) fuel cells, phosphoric acid fuel cells (PAFC), and alkaline fuel cells (AFC), among others.

Fuel processing units, typically various types of reformers, are used to produce the desired hydrogen rich gaseous stream from hydrocarbon fuel. Typically, such reformers require steam along with the fuel for carrying out the desired reaction. In some cases, the fuel processing unit also requires heated air, for example when the fuel processing unit is an autothermal reformer.

FIG. 1 shows a conventional scheme wherein fuel, in this case methane ($CH_4$), is fed to a catalytic steam reformer along with a separate stream of steam which is formed by passing water through a boiler. The catalytic steam reformer reacts the hydrocarbon with water as desired so as to produce a hydrogen rich flow for introduction to a fuel cell.

FIG. 2 shows another known system wherein fuel and steam are prepared and fed to a reformer as discussed above, and also wherein a heated stream of air is provided by passing air through a heat exchanger. The fuel processing unit in this case is either an autothermal reformer (ATR) or catalytic partial oxidizer (CPOX).

Fuel cells are desirable for use in various environments, including transportation and/or vehicular applications, wherein the size of the plant is critical. The need for boilers as illustrated in FIGS. 1 and 2 for heating water to provide steam results in increased space requirements for the power plant. Further, such a water circulation system requires a substantial amount of time to form steam from initial startup, and freezing of such a system is also a concern.

A further drawback of known systems is that the use of a boiler to generate steam renders control of the steam:hydrocarbon ratio difficult, and thereby leads to some instances where excess carbon is present in the reformer, which can result in coking or fouling of the unit.

It is clear that the need remains for improved systems and methods for preparing fuel and fuel constituents for the fuel cell, wherein preferably resulting power plant requires less space.

It is therefore the primary object of the present invention to provide a system and method for preparation of fuel for a fuel cell wherein certain components of conventional systems can be removed so as to reduce space needed for the fuel cell and related components.

It is a further object of the present invention to provide such a system and method wherein control of the ratio of steam to hydrocarbon is facilitated so as to reduce carbon deposition and catalyst deactivation.

It is still another object of the present invention to provide a system and method wherein startup time is reduced and potential problems for freezing water are avoided.

Other objects and advantages of the present invention will appear hereinbelow.

SUMMARY OF THE INVENTION

In accordance with the present invention, the foregoing objects and advantages have been readily attained.

According to the invention, a fuel cell system is provided, which comprises a fuel cell for reacting a hydrogen rich gas; a fuel processor system for converting a hydrocarbon fuel-steam mixture into said hydrogen rich gas; and means for preparing said hydrocarbon fuel-steam mixture comprising means for superheating a hydrocarbon fuel so as to provide a superheated fuel, and for mixing water with said superheated fuel so as to provide said hydrocarbon fuel-steam mixture.

In further accordance with the present invention, a method is provided for adding steam to a gas stream for a fuel processing system, which method comprises the steps of providing a gas stream; heating said gas stream so as to provide a heated stream having a temperature of at least about 260° C.; adding liquid water to said heated stream so as to change said water to steam and provide a gas-steam mixture; and feeding said gas-steam mixture to a fuel processing system.

The system and method of the present invention can be used for providing the desired steam mixed with hydrocarbon fuel, and further for providing humidified air to the reformer in the case of an ATR or CPOX unit, such that the need for a boiler to form steam can be completely avoided, thereby reducing the space occupied by the fuel cell system as desired in accordance with the present invention. Typical fuels would include methane, natural gas, gasoline, Diesel fuel, naphtha or the like.

BRIEF DESCRIPTION OF THE DRAWINGS

A detailed description of preferred embodiments of the present invention follows, with reference to the attached drawings, wherein:

FIGS. 1 and 2 illustrate conventional processes using a catalytic steam reformer and an autothermal or CPOX reformer;

FIG. 3 schematically illustrates a system and method in accordance with the present invention using a catalytic steam reformer;

FIG. 4 schematically illustrates a system and method in accordance with the present invention utilizing an autothermal or CPOX reformer;

DETAILED DESCRIPTION

Figure 5:
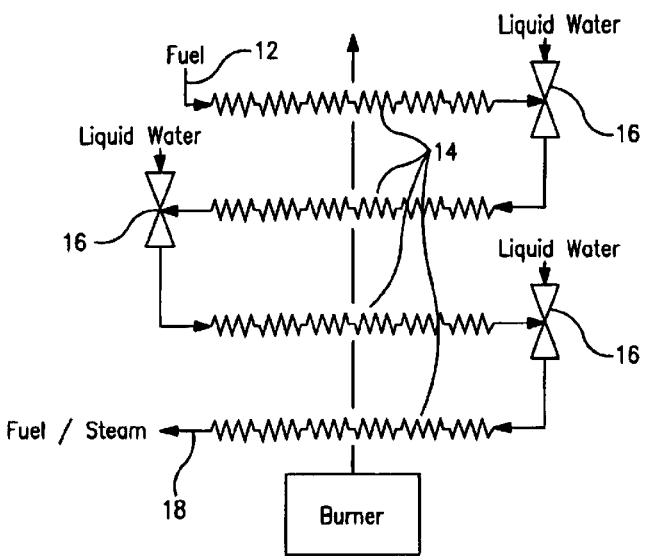
FIG. 5 further illustrates a fuel/steam mixture preparation system in accordance with the present invention.

The invention relates to fuel cell systems and, more particularly, to a system and method for preparing fuel for a fuel cell system.

A fuel cell typically includes an anode and a cathode, with an electrolyte disposed between the anode and cathode, and the fuel cell operates by feeding a hydrogen rich stream to the anode, while feeding an oxidant reactant gas to the cathode so as to create a potential across the electrolyte. Preparation of a suitable hydrogen rich gas for feeding to the anode has been a problem in the industry, and the present invention provides a solution to this problem.

FIG. 3 illustrates a fuel processing system 10, in this case a catalytic steam reformer, with feed of materials in accordance with the present invention. As set forth above, fuel processor system 10, as is known in the art, catalytically reforms a hydrocarbon/steam mixture into a hydrogen rich gas which is suitable for the anode of a fuel cell. As shown in FIG. 3, and in accordance with the present invention, a hydrocarbon stream 12 is provided and heated, for example using a heat exchanger 14 as schematically illustrated so as to provide a heated stream. A liquid phase water is injected into or mixed with the heated hydrocarbon stream, and heat from the hydrocarbon stream serves to vaporize the water so as to provide a hydrocarbon/steam mixture 18 as desired. As shown in FIG. 3, it may be desirable to provide a plurality of heat exchangers 14, and to inject water at a plurality of injection points 16. Injection points 16 are preferably positioned downstream of the exit of each heat exchanger 14 as shown.

Particularly suitable hydrocarbon streams include methane, natural gas, gasoline, Diesel fuel, naphtha and mixtures thereof.

Heat exchangers 14 may advantageously be operated so as to heat the hydrocarbon stream to a temperature of at least about 189° C., more preferably between about 189° C. and about 260° C. For methane, this is a temperature which is considered reasonable without concern for carbon deposition (fuel cracking), and which is also sufficiently high that a good quantity of water can be vaporized without cooling the stream below desired levels, for example about 189° C. or at a minimum the dew point of the mixture.

By repeating the heating and water injection steps, the hydrocarbon/steam mixture can be prepared so as to have a desirable ratio of water to methane, for example at least about 3, on a molar basis.

The end result is a hydrocarbon/steam mixture 18 which is suitable for fuel processor system 10 which, utilizing heat and a catalyst as is known in the art, converts the hydrocarbon/steam mixture as desired.

As is well known in the art, the basic reaction in a fuel processor system involving the conversion of methane is $CH_4$ and $H_2O$ into $H_2$ and $CO_2$, which thereby provides a necessary supply of hydrogen for the fuel cell. As a practical matter some CO and $H_2O$ will be in the stream as well as $N_2$ in the case of an ATR or CPOX reformer.

By comparing FIG. 3 to FIG. 1, it should be readily apparent that the step of boiling water to provide steam is completely avoided, as is the steam boiler itself. This advantageously reduces the space occupied by the various components of the fuel cell and fuel processor system, and also reduces any delay in initial startup of the fuel cell system since steam is generated in accordance with the present invention far more quickly than is possible using a conventional boiler and a feed of water directed to the boiler. Still further, and further advantageously, the potential for problems with the freezing of the water system are reduced and/or avoided.

A still further advantage of the system and method of the present invention is that the total ratio of water to hydrocarbon, and more particularly of water to carbon, can be controlled with specificity in the system and method of the present invention. In conventional processes such as that illustrated in FIG. 1, additional equipment must be used so as to monitor and/or control the amount of steam leaving the boiler so as to have control over the molar ratio of water to carbon. This is particularly desirable since insufficient ratio of water to carbon can result in coking and/or deposition of carbon on components of a catalytic steam reformer, both of which are undesirable, whereas direct addition of a known quantity or flow of water to the hydrocarbon fuel allows control of this ratio with certainty and without additional equipment.

FIG. 3 shows heat supplied to heat exchangers 14 as necessary to provide heating of the hydrocarbon stream as desired. In accordance with the present invention, this heat can advantageously be obtained from waste heat generated by other components of the system. For example, waste heat is generated by combusting the anode exhaust in a burner, or by cooling the reformer process exhaust, and such heat is an excellent source for use in the system and method of the present invention.

Turning now to FIG. 4, and as set forth above, certain types of fuel processing systems require the feed of air, as well as hydrocarbon and steam. FIG. 4 shows fuel processor system 10 as an autothermal or CPOX reformer, which are of this type. With such reformers, it is desirable for the air to have a certain degree of humidity, so as to carry additional water into the reformer which reduces the water required to be added into the fuel stream.

In accordance with the present invention, this is advantageously accomplished, without a boiler for creating steam, by directly heating a stream of air and injecting water into the heated stream. FIG. 4 shows fuel processor system 10 and a hydrocarbon stream 20 which is passed through heat exchangers 22. As in the embodiment of FIG. 3, a feed of water is provided and injected at injection points 24 into heated hydrocarbon stream exiting heat exchangers 22 such that water is vaporized so as to create the desired hydrocarbon/steam mixture.

Also as shown, an air stream 26 is provided and fed to heaters 28, with water being injected at injection points 30 which are down stream of heaters 28, so as to mix the water with heated air streams and thereby increase the humidity or dew point of the air. The resulting hydrocarbon/steam mixture 32 and humidified air 34 are then advantageously fed to the fuel processor 10 in accordance with the present invention. As shown in FIG. 4, these streams can be combined prior to being fed to the reformer, or can be introduced separately, as desired.

In accordance with this aspect of the present invention, the air stream is preferably heated to as high a temperature as possible using available waste heat sources in the system and as a minimum, to a temperature sufficient to provide for sufficient vaporization of water as desired. Further, conducting this step utilizing a series of heat exchangers and water injection points can advantageously allow for the provision of a heated air stream having a high dew point as desired. The heated air stream is preferably prepared having a dew point selected so as to provide, when combined with the fuel stream, a molar ratio of steam to fuel of at least about 3.

The embodiment of FIG. 4 has the same advantages in connection with avoiding the need for a boiler for steam to mix with the hydrocarbon, as was explained in connection with the embodiment of FIG. 3. Furthermore, this embodiment of the present invention allows for provision of an air stream having a good degree of water incorporated therein which is desirable for use with the fuel processor system, thus reducing the need for water addition into the fuel stream.

Further in accordance with this embodiment of the present invention, the heat to be provided to heat exchangers 22, 28 can be obtained from waste heat generated by other process components, as with the embodiment of FIG. 3, for example from the anode exhaust burner, reformer process exit and the like.

It should be appreciated that the embodiment of FIG. 4 advantageously provides for a hydrocarbon/steam mixture, and humidified air, for feed to the reformer, while avoiding the need for a boiler and associated components. This is particularly advantageous and renders a fuel cell and fuel processor system in accordance with the present invention particularly well suited for transportation and other uses where reduction in space is desired.

Turning now to FIG. 5, a further aspect of the present invention is illustrated. FIG. 5 illustrates a scheme in accordance with the present invention wherein hydrocarbon fuel and water are fed through a series of four heat exchangers 14 and three liquid water injection points 16 so as to provide staged heating and injection to the desired hydrocarbon/steam mixture.

Figure 6:
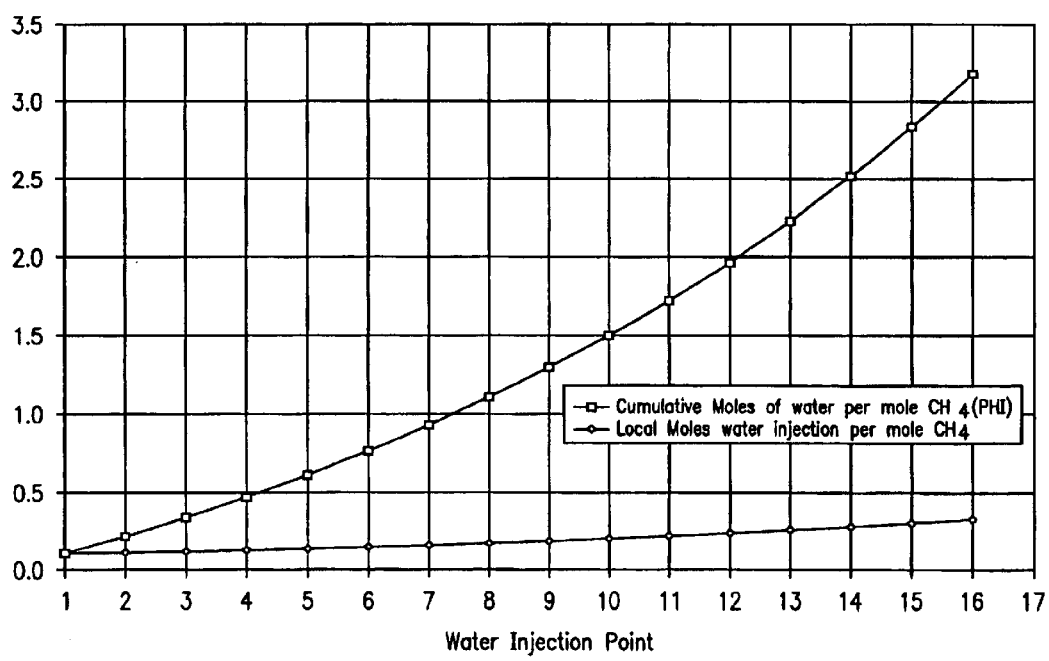
FIG. 6 graphically illustrates the molar relationship between cumulative water and $CH_4$ hydrocarbon fuel, as well as local water injection per mole of $CH_4$.

Turning to FIG. 6, an illustration is provided showing the relationship between the number of water injection points and cumulative moles of water per mole of $CH_4$ in accordance with the present invention. As shown, if the gas is heated to 260° C. and sufficient water is added to cool the mixture to 189° C., molar ratios of water to methane of greater than 3 can be reached with 16 injection points. Utilizing a structure as illustrated in FIG. 5, this can readily be accomplished and provides for excellent hydrocarbon/steam mixture generation as desired.

It should be appreciated that while the present disclosure is given in terms of methane as the hydrocarbon fuel, other hydrocarbon fuels would be equally applicable for use in accordance with the system and method of the present invention. Further, although fuel processor systems 10 are shown in FIGS. 3 and 4 as a catalytic steam reformer and an adiabatic reformer such as an autothermal (ATR) or CPOX reformer, respectively, other types of fuel processor systems can operate using the materials in accordance with the present invention, for example thermal steam reformers, hybrid reformers, cyclic reformers and the like. In fact, the system and method of the present invention in its broadest application can be readily adapted to any type of process wherein it is desired to provide a heated gas/steam mixture. Further, the system and method of the present invention are particularly well suited for use with polymer electrolyte membrane (PEM) fuel cells, although the system and method would be useful with other types of fuel cells as well.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A fuel cell system, comprising; a fuel cell for reacting a hydrogen rich gas;
   a fuel processor system for converting a hydrocarbon fuel-steam mixture into said hydrogen rich gas; and
   means for preparing said hydrocarbon fuel-steam mixture comprising (a) means for superheating a hydrocarbon fuel so as to provide a superheated fuel, and (b) means for injecting water in liquid state with said superheated fuel so as to provide said hydrocarbon fuel-steam mixture.

2. The system of claim 1, wherein said means for superheating comprises a plurality of heat exchangers arranged serially for superheating a stream containing said hydrocarbon fuel, and wherein said means for injecting water comprises a plurality of water injection points positioned respectively downstream of each heat exchanger of said plurality of heat exchangers.

3. The system of claim 1, further comprising means for providing a humidified air stream to said fuel processor system, said means for providing comprising (a) means for heating a stream of air so as to provide a heated air stream, and (b) means for mixing water with said heated air stream so as to provide said humidified air stream.

4. The system of claim 3, wherein said means for heating comprises a plurality of heat exchangers arranged serially for heating a stream containing said air, and wherein said means for injecting water comprises at least one water injection point positioned downstream of at least one of said plurality of heat exchangers.

5. The system of claim 3, wherein heat for said plurality of heat exchangers includes waste heat from at least one of said fuel cell and said fuel processor system.

6. The system of claim 1, wherein heat for said means for heating includes waste heat from at least one of said fuel cell and said fuel processor system.

7. The system of claim 1, wherein said fuel cell is a polymer electrolyte membrane (PEM) fuel cell.

8. A method for adding steam to a gas stream for a fuel processing system, comprising the steps of:
   providing a gas stream;
   heating said gas stream so as to provide a heated stream having a temperature of at least about 189° C.;
   injecting liquid water to said heated stream so as to change said water to steam and provide a gas-steam mixture; and
   feeding said gas-steam mixture to a fuel processing system.

9. The method of claim 8, wherein said gas stream is a hydrocarbon fuel, and wherein said fuel processing system converts said hydrocarbon fuel to a hydrogen rich gas stream for a fuel cell.

10. The method of claim 9, wherein said hydrocarbon fuel is selected from the group consisting of methane, natural gas, gasoline, Diesel fuel, naphtha and mixtures thereof.

11. The method of claim 9 wherein said gas stream is methane.

12. The method of claim 9 wherein said heating step comprises superheating said hydrocarbon fuel.

13. The method of claim 9, wherein said heating step comprises heating said gas stream to a temperature of between about 189° C. and about 260° C.

14. The method of claim 9, wherein said injecting step comprises adding said liquid water so as to provide said gas-steam mixture having a temperature of at least about 189° C.

15. The method of claim 9, further comprising the step of repeating said heating step and said injecting step with said gas-steam mixture until said mixture has a molar ratio of water to hydrocarbon fuel of at least about 3.

16. The method of claim 8, further comprising the step of feeding a humidified air stream to said fuel processing system.

17. The method of claim 16, wherein said step of feeding said humidified air stream comprises providing a stream containing air, heating said stream so as to provide a heated stream, and adding liquid water to said heated stream so as to provide said humidified air stream.

18. The method of claim 17, further comprising repeating said heating step and said adding step with said humidified air stream so as to produce a final humidified air stream having a dew point selected so as to provide, when combined with the said fuel stream, a molar ratio of steam to fuel of at least about 3.

19. The method of claim 16, wherein heat for said heating step is waste heat obtained from at least one of said fuel processing system and said fuel cell.

20. The method of claim 9, wherein heat for said heating step is waste heat obtained from at least one of said fuel processing system and said fuel cell.

21. The method of claim 9, wherein said fuel cell is a polymer electrolyte membrane (PEM) fuel cell.

22. A fuel cell system, comprising: a fuel cell for reacting a hydrogen rich gas;

a fuel processor system for converting a hydrocarbon fuel-steam mixture into said hydrogen rich gas; and means for preparing said hydrocarbon fuel-steam mixture comprising (a) means for superheating a hydrocarbon fuel so as to provide a superheated fuel, and (b) means for mixing water in liquid state with said superheated fuel so as to provide said hydrocarbon fuel-steam mixture, wherein said means for mixing water comprises a plurality of water injection points positioned respectively downstream of said means for superheating.

23. A method for adding steam to a gas stream for a fuel processing system, comprising the steps of:

providing a gas stream;

heating said gas stream so as to provide a heated stream having a temperature of at least about 189° C.;

adding liquid water to said heated stream so as to change said water to steam and provide a gas-steam mixture; and feeding said gas-steam mixture to a fuel processing system, wherein said adding step comprises injecting water at a plurality of water injection points positioned respectively downstream of said heating step.

24. A method for adding steam to a gas stream for a fuel processing system, comprising the steps of:

providing a gas stream;

heating said gas stream so as to provide a heated stream having a temperature of at least about 189° C.;

adding liquid water to said heated stream so as to change said water to steam and provide a gas-steam mixture; and feeding said gas-steam mixture to a fuel processing system, wherein said heating step is carried out using a plurality of heat exchangers arranged serially for superheating a stream containing said hydrocarbon fuel, and wherein said adding step comprises injecting water at a plurality of water injection points positioned respectively downstream of each heat exchanger of said plurality of heat exchangers.

* * * * *